United States Patent
Clevorn

(10) Patent No.: US 10,440,650 B2
(45) Date of Patent: Oct. 8, 2019

(54) METHODS AND DEVICES BASED ON DYNAMIC RECEIVE DIVERSITY

(71) Applicant: Intel IP Corporation, Santa Clara, CA (US)

(72) Inventor: Thorsten Clevorn, Munich (DE)

(73) Assignee: Intel IP Corporation, Santa Clara, CA (US)

(*) Notice: Subject to any disclaimer, the term of this patent is extended or adjusted under 35 U.S.C. 154(b) by 88 days.

(21) Appl. No.: 14/993,358

(22) Filed: Jan. 12, 2016

(65) Prior Publication Data

US 2016/0316433 A1    Oct. 27, 2016

(30) Foreign Application Priority Data

Apr. 27, 2015  (DE) .................. 10 2015 106 405

(51) Int. Cl.
*H04B 7/08* (2006.01)
*H04W 52/02* (2009.01)

(52) U.S. Cl.
CPC ...... *H04W 52/0232* (2013.01); *H04B 7/0877* (2013.01); *H04W 52/0216* (2013.01); *H04W 52/0229* (2013.01); *Y02D 70/1262* (2018.01); *Y02D 70/142* (2018.01); *Y02D 70/444* (2018.01)

(58) Field of Classification Search
CPC ... H04B 7/0877; H04B 7/02; H04W 52/0232; H04W 52/0216
See application file for complete search history.

(56) References Cited

U.S. PATENT DOCUMENTS

| 8,787,290 | B2 | 7/2014 | Dai | |
|---|---|---|---|---|
| 2006/0218264 | A1* | 9/2006 | Ogawa | H04L 47/10 709/223 |
| 2011/0201295 | A1* | 8/2011 | Ma | H04B 7/0871 455/272 |
| 2012/0120860 | A1* | 5/2012 | Chui | H04B 1/711 370/311 |
| 2012/0282875 | A1* | 11/2012 | Park | H04W 4/90 455/404.1 |
| 2012/0287815 | A1* | 11/2012 | Attar | H04B 7/0871 370/253 |
| 2013/0114488 | A1* | 5/2013 | Fang | H04W 52/0206 370/311 |

(Continued)

FOREIGN PATENT DOCUMENTS

| DE | 112012004703 T5 | 8/2014 |
|---|---|---|
| WO | WO-2012/138922 A1 | 10/2012 |

(Continued)

OTHER PUBLICATIONS

Title: The TCP/IP Guide Author: Charles M. Kozierok Date: Jan. 5, 2014 Edition: Version 3 pp. 4.*

(Continued)

*Primary Examiner* — Un C Cho
*Assistant Examiner* — Lalita W Pace
(74) *Attorney, Agent, or Firm* — Schiff Hardin LLP

(57) ABSTRACT

A method at a client includes receiving data from a server at a first dynamic receive diversity antenna port, evaluating a data throughput of the data from the server, and selectively activating or deactivating a circuit coupled to a second dynamic receive diversity antenna port based on the data throughput.

28 Claims, 7 Drawing Sheets

(56) References Cited

U.S. PATENT DOCUMENTS

| | | | |
|---|---|---|---|
| 2013/0260758 A1* | 10/2013 | Zhao | H04W 36/14 |
| | | | 455/436 |
| 2014/0098694 A1* | 4/2014 | Damji | H04W 52/0229 |
| | | | 370/252 |
| 2014/0269373 A1* | 9/2014 | Nimmala | H04W 24/02 |
| | | | 370/252 |
| 2014/0273866 A1* | 9/2014 | Swaminathan | H04W 52/0209 |
| | | | 455/67.11 |
| 2014/0302803 A1* | 10/2014 | Komninakis | H04B 7/0691 |
| | | | 455/78 |
| 2015/0124605 A1* | 5/2015 | Gholmieh | H04W 24/08 |
| | | | 370/232 |
| 2016/0127028 A1* | 5/2016 | Wang | H04B 7/0817 |
| | | | 370/329 |
| 2016/0219518 A1* | 7/2016 | Zhao | H04W 52/0225 |

FOREIGN PATENT DOCUMENTS

| | | |
|---|---|---|
| WO | WO-2012/158430 A1 | 11/2012 |
| WO | WO-2015/153521 A1 | 10/2015 |

OTHER PUBLICATIONS

Charles M. Kozierok, The TCP/IP Guide, Jan. 5, 2014, Version 3, pp. 1-4 (Year: 2014).*
Office Action dated Dec. 2, 2015 for German Patent Application No. 102015106405.7 (with English translation).
Office Action dated Jan. 5, 2018 for Taiwan Application No. 105108823.

* cited by examiner

METHODS AND DEVICES BASED ON DYNAMIC RECEIVE DIVERSITY

FIELD

The disclosure relates, in general, to wireless communication. More particular, the disclosure relates to methods based on dynamic receive diversity and devices configured to perform such methods.

BACKGROUND

Various factors may contribute to a power consumption of mobile devices. For example, power consumption may depend on a number of receive antennas or receive paths used in a cellular modem. Within the framework of LTE, 3G, WiFi, etc., cellular modems may include multiple receive and transmit paths configured to perform dynamic receive diversity or Multiple Input Multiple Output (MIMO) techniques.

Methods and devices employed in wireless communication networks constantly have to be improved. In particular, it may be desirable to provide methods that improve the performance of devices operating in such networks. In addition, it may be desirable to provide methods that reduce a power consumption of these devices.

For these and further reasons there is a need for the present invention.

BRIEF DESCRIPTION OF THE DRAWINGS

The accompanying drawings are included to provide a further understanding of examples of the disclosure and are incorporated in and constitute a part of this specification. The drawings illustrate examples and together with the description serve to explain principles of examples. Other examples and many of the intended advantages of examples will be readily appreciated as they will become better understood by reference to the following detailed description.

DETAILED DESCRIPTION

Figure 1:
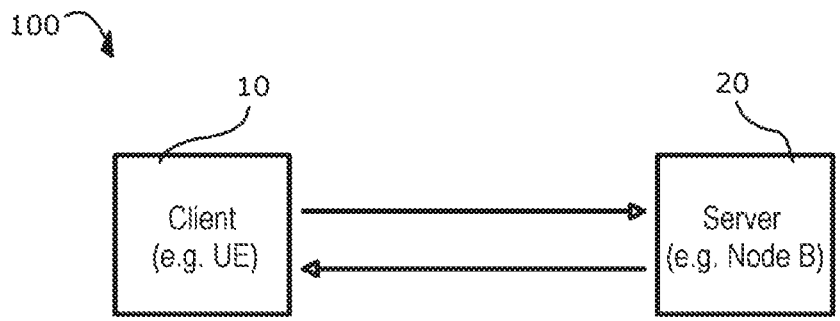
FIG. 1 schematically illustrates a wireless communication system 100 including a client 10 and a server 20.

In the following detailed description, reference is made to the accompanying drawings, which form a part thereof, and in which is shown by way of illustration examples in which the invention may be practiced. Other examples may be utilized and structural or logical changes may be made without departing from the scope of the present disclosure. The following detailed description, therefore, is not to be taken in a limiting sense, and the scope of the present invention is defined by the appended claims.

The features of the various examples described herein may be combined with each other, unless specifically noted otherwise. Further, like reference numerals may designate corresponding identical or similar parts.

As employed in this specification, the terms "coupled" and/or "connected" are not meant to mean in general that the elements must be directly coupled or connected together, intervening functional elements may be provided between the "coupled" or "connected" elements. However, although not restricted to that meaning, the terms "coupled" and/or "connected" may also be understood to optionally disclose an implementation in which the elements are directly coupled or connected together without intervening elements provided between the "coupled" or "connected" elements.

Devices and methods for operating devices are described herein. Comments made in connection with a described device may also hold true for a corresponding method and vice versa. For example, if a specific act of a method is described, a corresponding device for performing the method may include a component for performing the act in a suitable manner, even if such component is not explicitly described or illustrated in the figures. In addition, the features of the various aspects and examples described herein may be combined with each other, unless specifically noted otherwise.

Examples as described herein may be implemented in discrete circuits, partially integrated circuits or fully integrated circuits. Further, examples may be implemented on a single semiconductor chip or on multiple semiconductor chips connected to each other. Furthermore, it should be understood that examples may be implemented in software or in dedicated hardware or partially in software and partially in dedicated hardware.

The methods and devices described herein may be used for various wireless communication networks. The terms "network", "system", "radio communications system" and "wireless communications system" may be used synonymously herein.

The methods and devices described herein may be implemented in wireless communication networks, in particular communication networks based on CDMA, WCDMA, an LTE and/or OFDM standard or based on a WiFi standard and in particular MIMO communication systems. The methods and devices described herein may further be implemented in a mobile device (or mobile station or User Equipment (UE))

or a base station (NodeB, eNodeB). The described devices may include integrated circuits and/or passives and may be manufactured according to various technologies. For example, the circuits may be designed as logic integrated circuits, analog integrated circuits, mixed signal integrated circuits, memory circuits and/or integrated passives, etc.

The methods and devices described herein may be configured to transmit and/or receive radio signals. Radio signals may be or may include radio frequency signals radiated by a radio transmitting device (or radio transmitter or sender) with a radio frequency lying in a range of about 3 Hz to about 300 GHz. The frequency range may correspond to frequencies of alternating current electrical signals used to produce and detect radio waves.

FIG. 1 schematically illustrates a wireless communication system or network 100 including a client 10 and a server 20. The client 10 may e.g. correspond to a User Equipment (UE) which may represent any kind of mobile phone, smartphone, laptop computer, tablet, cellular modem, video-game console, etc. The UE may also be referred to as mobile terminal, mobile device, mobile station, etc. The server 20 may e.g. correspond to a NodeB which may also be referred to as base station, eNodeB, base transceiver station, etc. For example, the network 100 may be based on LTE, 3G, WiFi, etc.

A communication between the client 10 and the server 20 may be based on a communication protocol. In one example, such communication protocol may correspond to a Transmission Control Protocol (TCP) which may be regarded as a protocol of the Internet protocol suite (IP). In this regard, TCP may also be referred to as TCP/IP. The TCP may provide reliable, ordered and error-checked delivery (or notification of failure to deliver) of transmission data between programs running on devices that may be connected to a local area network, an intranet or the public Internet. The transmission data may correspond to pieces of information that may be referred to as packets. In particular, a packet may be a sequence of octets (bytes) and may include a header followed by a body. The header may identify the source and destination of the packet and may further include control information. The body of the packet may include the data to be transmitted. In particular, the TCP may reside at the transport layer. For example, the TCP may be used by web browsers when the browser connects to servers on the World Wide Web. The TCP may particularly be employed to deliver email and transfer files from one location to another. Communication protocols encapsulated in TCP are, for example, HTTP, HTTPS, SMTP, POP3, IMAP, SSH, FTP, Telnet, etc.

A TCP connection between the client 10 and the server 20 may be established based on a three-way handshake. In a first act, the client 10 may send a SYN data packet to the server 20 on the network 100 or an external network. The objective of the SYN data packet may be to query whether the server 20 is open for a new connection. When the server 20 receives the SYN packet from the client 10, the server 20 may respond and return a confirmation receipt in a second act. The confirmation receipt may correspond to an ACK data packet or SYN/ACK data packet. The client 10 may receive the SYN/ACK data packet from the server 20 and may respond with an ACK data packet in a third act. Upon completion of the described three acts (or "handshakes"), both the client 10 and the server 20 have received an acknowledgment of the connection such that a connection is created and a full-duplex communication may be established.

Figure 2A:
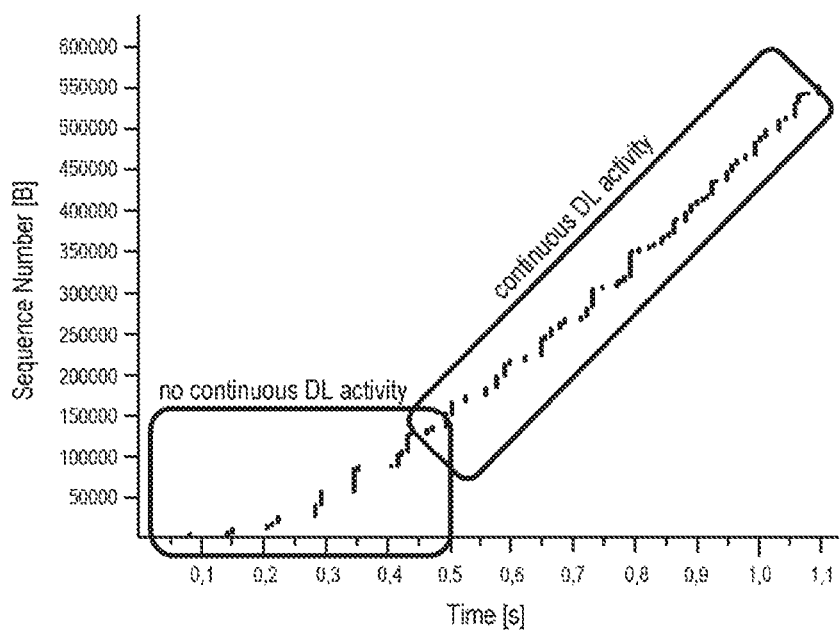
FIG. 2A shows a time/sequence diagram based on a data communication between a server and a client.

FIG. 2A shows a time/sequence diagram based on a data communication between the client 10 and the server 20, for example. The horizontal axis of the diagram represents time in seconds while the vertical axis represents a throughput of data successfully transmitted from the server 20 to the client 10, i.e. the rate of successful message delivery via the radio communication channel. In FIG. 2A, the vertical axis particularly represents the number of sequences or data packets that are transmitted by the server 20 and successfully received at the client 10. Here, a successful reception of a data packet may correspond to a reception of a data packet including an acknowledgement of the reception in form of an ACK data packet sent from the client 10 to the server 20. For example, the data communication of FIG. 2A may correspond to a download of a data file from the server 20 by the client 10. The data file may e.g. correspond to a text file, a web page, an image file, etc. In FIG. 2A, it is assumed that a connection between the client 10 and the server 20 has already been established. That is, FIG. 2A does not necessarily include a data transmission related to a three-way handshake between the client 10 and the server 20.

The diagram of FIG. 2A includes a first section of data transmission labeled "no continuous DL (download) activity" followed by a second section of data transmission labeled "continuous DL activity". The discrete parts of the shown graph in the first and second section represent data packets that have been successfully received from the server 20 at the client 10. Gaps are arranged between these transmitted data packets. During the time period of such gap, there may be no data that is exchanged between the client 10 and the server 20. In particular, the transmission of the file to be downloaded by the client 10 from the server 20 may be paused. The specific data transmitted between the client 10 and the server 20 in the first section and the second section of the time/sequence diagram of FIG. 2A is described below in connection with FIGS. 2B and 2C.

As can be seen from FIG. 2A, at the beginning of a TCP transmission there may be no continuous DL (and UL) activity. Rather, for a first time interval of about 0.5 seconds, i.e. in the first section of non-continuous DL activity, only a small part of DL TCP data is transmitted from the server 20 to the client 10. In FIG. 2A, the gradient of the illustrated graph may particularly increase with time. An increase of the graph means that the number of data packets successfully received at the client 10 per time increases. The increase of the graph's gradient may particularly originate from a slow-start algorithm that may be used at the beginning of the TCP communication.

Figure 2B:
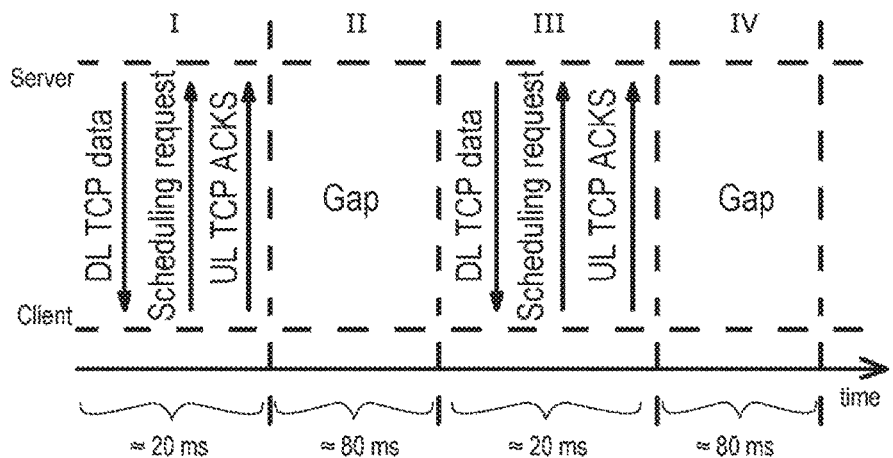
FIG. 2B schematically illustrates a data communication in a first section of the time/sequence diagram of FIG. 2A.

FIG. 2B schematically illustrates a data communication during the non-continuous DL (and UL) activity in the first section of the time/sequence diagram of FIG. 2A. In a first time interval I, the server 20 transmits DL TCP data packet to the client 10. For example, the DL TCP data packet may include a piece of a data file that is to be downloaded from the server 20 by the client 10. After receiving the DL TCP data packet, the client 10 may respond with a scheduling request to transmit a TCP ACK in the UL and further to request a transmission (or the scheduling of a transmission) of a further DL TCP data packet from the server 20 to the client 10. The client 10 acknowledges the reception of the DL TCP data packet by transmitting an Uplink (UL) TCP ACK data packet to the server 20. In general, the time required for performing the described acts of the first time interval I may be arbitrary and may depend on the considered scenario. In particular, the required time may lie in a range from about 10 milliseconds to about 30 milliseconds, more particular from about 18 milliseconds to about 22 milliseconds, and may even more particular have a value of about 20 milliseconds. In a second time interval II, no data is received by the client 10 from the server 20. The second interval II thus may correspond to one of the gaps in the non-continuous DL activity part described in connection with FIG. 2A. During the non-continuous DL activity section of the data transmission, the gap may have a length that may lie in a range from about 75 milliseconds to about 85 milliseconds, and may particularly have a value of about 80 milliseconds.

In the following time intervals, the acts described in connection with the time intervals I and II may be repeated until the data transmission between the client 10 and the server 20 may leave the non-continuous DL activity and may enter the continuous DL activity as shown in FIG. 2A. That is, a data transmission during a third time interval III may be similar to the data transmission of the first time interval I described above, a data transmission during a fourth time interval IV may be similar to the data transmission of the second time interval II described, a data transmission during a fifth time interval V (not illustrated) may be similar to the data transmission of the first time interval I, etc. The data transmission of time intervals I and II may be repeated for about 5 to 6 times, i.e. for about 0.5 seconds, until the data transmission between the client 10 and the server 20 may enter the second section of a continuous DL activity.

Figure 2C:
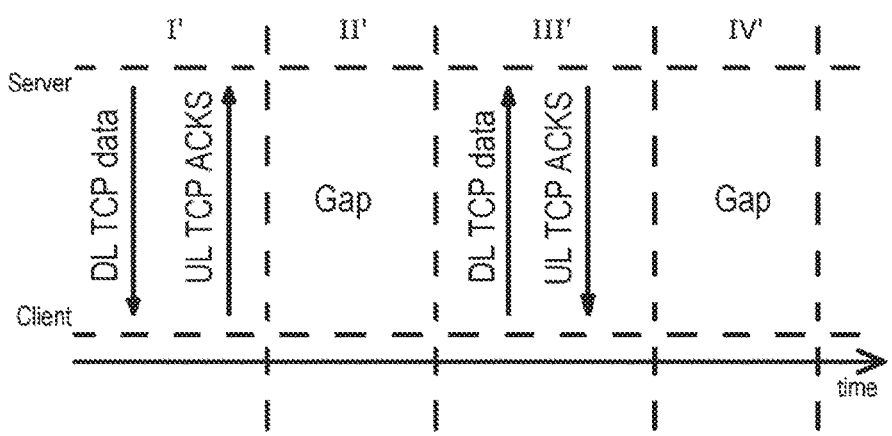
FIG. 2C schematically illustrates a data communication in a second section of the time/sequence diagram of FIG. 2A.

FIG. 2C schematically illustrates a data communication at the beginning of the continuous DL (and UL) activity in the second section of the time/sequence diagram of FIG. 2A. FIG. 2C can be seen as an illustration of the data communication during a transition between the non-continuous activity and the continuous activity, but it can also be seen as a simplified illustration of the data communication during the continuous activity. A more detailed illustration of the data communication during the continuous activity is described in connection with FIG. 2D. In a first time interval I', the server 20 may transmit a further DL TCP data packet to the client 10. After receiving the DL TCP data packet, the client 10 may acknowledge the reception of the DL TCP data packet by transmitting an Uplink (UL) TCP ACK data packet to the server 20. In contrast to the time interval I of the non-continuous data transmission in FIG. 2B, the client 10 does not necessarily respond to the server 20 with a further scheduling request. A time required for performing the described acts of the first time interval I' may have a value of about 20 milliseconds or smaller.

In a second time interval II', no data may be received at the client 10 from the server 20. The second interval II' thus may correspond to a gap in the continuous part of the DL activity described in connection with FIG. 2A. During the continuous section of the data transmission, the gap may have a length that may lie in a range from about 10 milliseconds to about 50 milliseconds. In the following time intervals, the acts of the time intervals I' and II' may be repeated, in particular until the data transmission, e.g. the file download, between the client 10 and the server 20 may be completed. That is, a data transmission during a third time interval III' may be similar to the data transmission of the first time interval I', a data transmission during a fourth time interval IV' may be similar to the data transmission of the second time interval II', a data transmission during a fifth time interval V' (not illustrated) may be similar to the data transmission of the first time interval I', etc.

As can be seen from the above, at the beginning of a data transmission between the client 10 and the server 20, during the non-continuous DL activity, the client 10 may be required to send scheduling requests to the server 20 as long as no stable and continuous data transmission between the client 10 and the server 20 is established. At the point where the data transmission has become stable, i.e. the size of the gaps between the transmitted data packets falls below a specific time value, no further scheduling requests may be required to be transmitted from the client 10 to the server 20.

The size of the gaps of (see e.g. time intervals II and II') in FIGS. 2B and 2C may depend on various factors. For example, the gap size may depend on an application of a slow-start algorithm. Here, the gaps may be seen as idle times in which no additional data transmission is (not yet) enabled. Since the impact of the slow-start algorithm on the gap size may become irrelevant in the section of continuous DL activity, the gap size of section II may be particularly greater than the gap size of section II'. Furthermore, the gap size may depend on the number of clients that may be scheduled by the server 20. If the server 20 communicates with multiple clients, only reduced resources may be scheduled for one specific client, for example the considered client 10. In other words, the time during a gap in a communication with a first client may be used by the server 20 to communicate with a different second client. Furthermore, the gap size may depend on the round-trip delay times (RTD) (or a round-trip times (RTT)) of the transmitted data packets. The RTD (or RTT) may be defined as the time length required for a signal to be transmitted (e.g. from the server 20 to the client 10) plus the time length required for an acknowledgment of the signal to be received (e.g. from the client 10 to the server 20). Since the number of transmitted data packets may increase during the continuous data transmission and the roundtrip times may differ for different data packets, in reality, the graph of FIG. 2A may become blurred or fuzzy, in particular in the section of continuous DL activity.

Figure 2D:
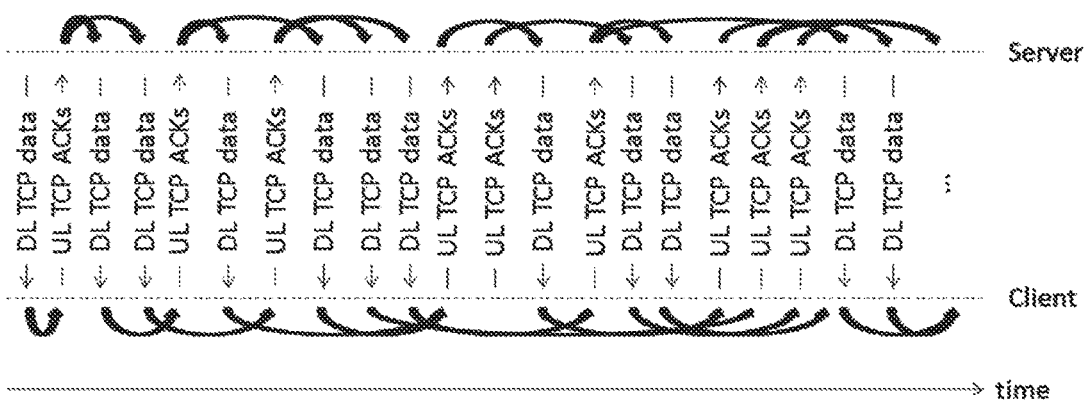
FIG. 2D schematically illustrates a data communication in a third section of the time/sequence diagram of FIG. 2A.

FIG. 2D schematically illustrates a data communication during the continuous activity. Here, DL TCP data packets may be transmitted from the server 20 to the client 10, and UL TCP ACK data packets may be transmitted from the client 10 to the server 20. In FIG. 2D, arrows at the client side indicate the DL TCP data packets and UL TCP ACK data packets that are associated with each other. As previously mentioned, due to e.g. differing roundtrip times, the associated DL TCP data packets and UL TCP ACK data packets may not necessarily be well ordered in a successive manner, but may be mixed resulting in a blurred activity as described above. There may occur time gaps between consecutive DL TCP data packets, for example because of other users being served in that respective time instances. Similarly, there may occur time gaps between consecutive UL TCP ACK data packets. It is to be noted that DL TCP data packets and UL TCP ACK data packets associated with previous DL data may be transmitted at a same time instance.

During a communication between the client 10 and the server 20, the data throughput may be limited by at least one of a congestion window and a receive window (or transmission window). The congestion window may be configured to control and/or avoid a congestion of the data communication, for example between the server 20 and the client 10, such that a capacity of the network is not exceeded. The size of the congestion window may be calculated by estimating a degree of congestion between the client 10 and the server 20. In particular, the congestion window may be maintained by the server 20.

The receive window may be configured to control and/or avoid that a capacity of the client 10 to process data is exceeded. The receive window may determine or correspond to the amount of data that the client 10 can accept without acknowledging the server 20. In general, if the server 20 has not received an acknowledgement for a first packet it has sent to the client 10, the server 20 may stop and wait. If the wait exceeds a certain limit, the server 20 may retransmit the transmitted data packet such that the communication based on the TCP may achieve a reliable data transmission. Each TCP segment transmitted from the client 10 to the server 20 may contain a current value of the receive window. For example, if the server 20 may receive an ACK message from the client 10 which acknowledges the byte with the number 5000 and further specifies a receive window having a size of 10000 bytes, the server 20 may not necessarily transmit further data packets after having sent the byte with the number 15000, even if the set congestion window may allow such transmission.

Even if there is no packet loss in the network, the receive window may limit a throughput of the data connection between the client 10 and the server 20. Since the TCP may transmit data up to the window size before waiting for acknowledgements, the full bandwidth of the network may not always be exploited. In particular, a limitation of the throughput caused by the size of the receive window may exemplarily be specified by the following inequality: Th≤RWin/Rtt. Here, the quantity Th may denote the size of the throughput, the quantity RWin may denote the size of the receive window, and the quantity Rtt may denote the size of the round-trip time for the path(s) for transmitting data packets.

The size of the receive window may be particularly indicated by the client 10 side of the TCP communication and may correspond to the amount of free receive memory the client 10 has allocated for the respective connection. Otherwise, the client 10 may risk a loss of received packets due to a lack of memory space.

According to the above said, the throughput may thus be limited by the TCP receive window. The TCP server may perform a certain flow control, for example a slow start and a congestion avoidance, and may limit the throughput also by the TCP transmission window. In one example, at the beginning of a TCP communication, the TCP receive window may not yet have sufficiently opened such that the connection throughput may be capped when the TCP transmission window is hit. Even when the receive window is hit, the wireless link may support more throughput.

Figure 3:
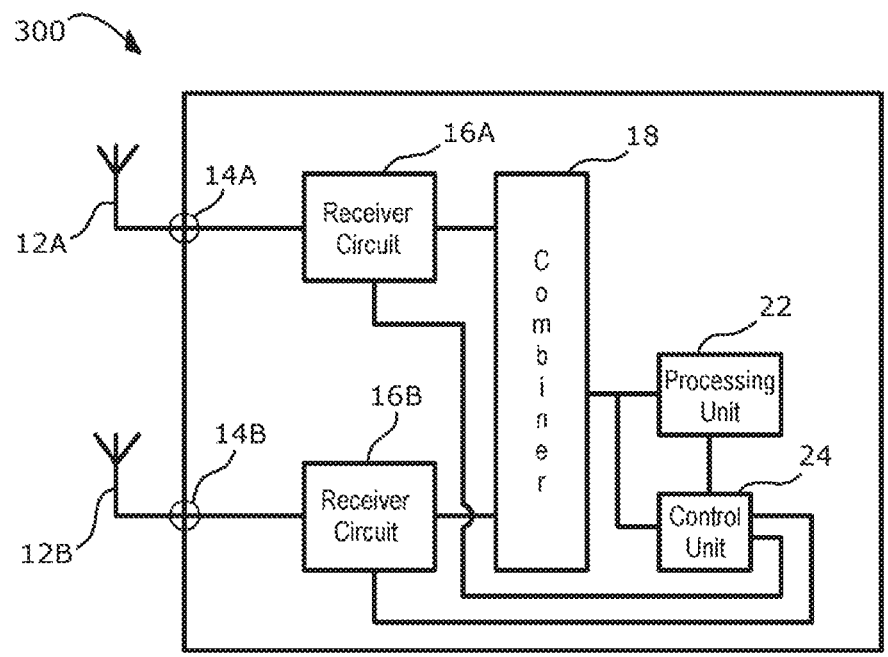
FIG. 3 schematically illustrates a User Equipment 300 in accordance with the disclosure that may operate as a client in a wireless communication system.

FIG. 3 schematically illustrates a User Equipment 300 that may operate as a client in a wireless communication system, for example the client 10 of FIG. 1. The UE 300 may be used to perform any of the methods in accordance with the disclosure as described herein. For example, the UE 300 may be used in a scenario described in connection with FIGS. 2A to 2C.

The UE 300 may include a first receive antenna 12A and a second receive antenna 12B, in particular a first dynamic receive diversity antenna 12A and a second dynamic receive diversity antenna 12B. In FIG. 3, only two receive antennas 12A, 12B are illustrated for the sake of simplicity. However, the example of FIG. 3 may be extended to an arbitrary number of receive antennas. Each of the receive antennas 12A, 12B may be configured to receive downlink radio signals from e.g. a NodeB that may operate as a server, for example the server 20 of FIG. 1. In addition, the receive antennas 12A, 12B may be configured to convert the received signals into electrical signals representing the received downlink signals. The UE 300 may be configured to perform an arbitrary antenna switching scheme and/or may be based on an arbitrary dynamic receive diversity technology. The receiver diversity (RxDiv) or antenna diversity of the UE 300, which may also be referred to as space diversity, may provide an application of any of several wireless diversity schemes employing two or more receive antennas.

For the sake of simplicity, FIG. 3 only illustrates the receive section of the UE 300. However, the UE 300 may further include multiple transmit antennas which are not illustrated for the sake of simplicity. Using multiple antennas at both transmit and receive may result in a multiple-input multiple-output (MIMO) system. Using diversity techniques at both ends of the link may be referred to as space-time coding.

The UE 300 may further include a first antenna port 14A, in particular a first dynamic receive diversity antenna port 14A, that may be coupled to the first receive antenna 12A. The antenna port 14A may provide a coupling between the first receive antenna 12A and a circuit which may include components that may be configured to process the electrical signals representing the received downlink signals. The UE 300 may further include a second antenna port 14B, in particular a second dynamic receive diversity antenna port 14B that may be coupled to the second receive antenna 12B. The first receive antenna port 14A may be similar to the second receive antenna port 14B.

The UE 300 may further include a first receiver circuit 16A that may be coupled to the first receive antenna port 14A. The first receiver circuit 16A may be configured to process electrical signals received from the first antenna port 14A. For example, the first receiver circuit 16A may include or may be a part of at least one of a Rake receiver, an equalizer, an OFDM receiver, and other suitable receivers depending on the type of the considered UE or client. The first receiver circuit 16A may include one or more antenna amplifiers that may be configured to amplify or attenuate the received signals. Further, the first receiver circuit 16A may include an Analog-to-Digital (ADC) converter that may be configured to convert received analog signals into the digital domain. Further, the first receiver circuit 16A may include one or more mixers that may be configured to mix the received signals down to a baseband (or intermediate band). Further, the first receive circuit 16A may include one or more demodulators that may be configured to demodulate received signals and/or one or more decoders that may be configured to decode received signals. By way of example, the (de)modulation scheme (constellation) may be based on phase shift keying (QPSK) or quadrature amplitude modulation, e.g. 16 QAM or 256 QAM. The UE 300 may further include a second receiver circuit 16B that may be coupled to the second receive antenna port 14B. The second receiver circuit 16B may be similar to the first receiver circuit 16A.

The UE 300 may further include a combining unit 18 that may be configured to combine the multiple signals received from the first receiver circuit 16A and the second receiver circuit 16B. Each of the receiver circuits 16A and 16B may receive an independent copy of a signal that has been transmitted to the UE 300 by e.g. a NodeB. In the combining unit 18, these independent samples may be combined in a suitable fashion. A specific implementation of the combining unit 18 may particularly depend on the type of the considered UE or client. In one non-limiting example, the combining unit 18 may correspond to a Maximum Ratio Combining unit.

The UE 300 may further include a processing unit 22 that may be coupled to the combining unit 18 and configured to process signals received from the combining unit 18. For example, the processing unit 22 may correspond to a digital signal processor or an application processor. The processing unit 22 may be configured to run one or more software programs. For example, a protocol stack software may run on the processing unit 22. Such protocol stack software may be configured to control a data transmission according to a TCP protocol between the UE 300 and a server, for example a NodeB. In this regard, the processing unit 22 may e.g. be configured to monitor a transmission of scheduling requests from the client 10 to the server 20. The protocol stack software may e.g. be configured to detect a discontinuation of a data transmission between the client 10 and the server 20, the discontinuation being caused by a receive window.

The UE 300 may further include a control unit 24 which may also be referred to as diversity controller. The control unit 24 may be coupled to at least one of the combining unit 18 and the processing unit 22. In addition, the control unit 24 may be coupled to at least one of the first receiver circuit 16A and the second receiver circuit 16B. The control unit 24 may be configured to selectively activate or deactivate one or both of the receiver circuits 16A, 16B. For this purpose, the control unit 24 may be configured to control the power of the diversity receiver by turning on or off the receiver circuits 16A, 16B. In particular, the control unit 24 may be configured to (de)activate parts of a receiver circuit that are to be (de)activated. In this regard, the antenna ports 14A, 14B may be regarded as a part of the receiver circuits 16A, 16B or not. In one example, all components of the respective receiver circuit arranged between the antenna port and the ADC may be deactivated while components arranged downstream of the ADC may still remain active.

An activation and/or deactivation of one or more of the receiver circuits 16A, 16B may be based on one or more evaluation criteria that are discussed below. In particular, a decision to selectively activate/deactivate one or more of the receiver circuits 16A, 16B may be based on an evaluation of a data throughput between the UE 300 and a server, for example a NodeB. The control unit 24 may receive data on which such evaluation may be based from the combining unit 18 and/or the processing unit 22.

Figure 4:
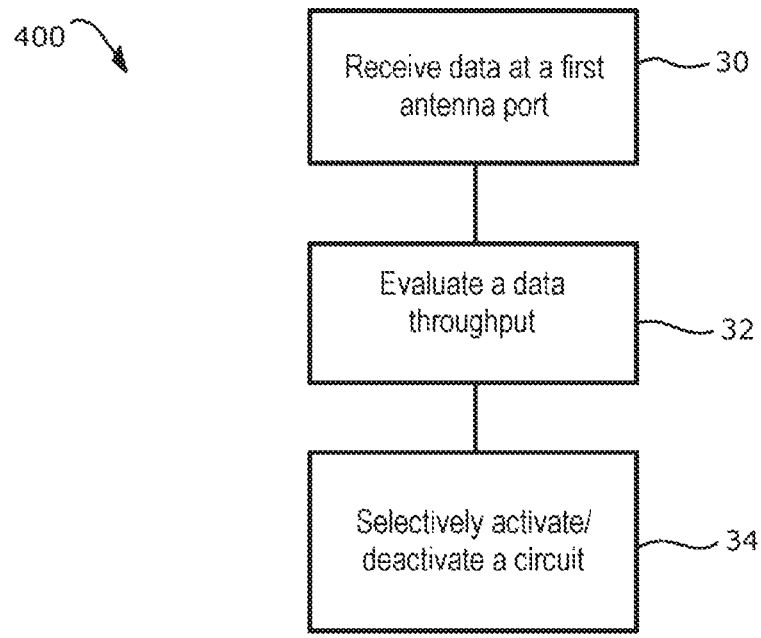
FIG. 4 schematically illustrates a method 400 based on dynamic receive diversity in accordance with the disclosure.

FIG. 4 schematically illustrates a method 400 based on dynamic receive diversity in accordance with the disclosure. The method 400 may be seen as an example illustrating a basic concept of the present disclosure. The method 400 may be extended by further acts, for example by one or more of the acts described in connection with the methods 700 and 800 of FIGS. 7 and 8.

In an act 30, data is received from a server at a first dynamic receive diversity antenna port of a client. Referring back to FIG. 3, the client may correspond to the UE 300 which may receive data from a server at e.g. the first antenna port 14A. In a further act 32, a data throughput between the server and the client is evaluated. Referring back to FIG. 3, components of the UE 300, such as e.g. the processing unit 22 and/or the control unit 24, may evaluate a throughput of data transmitted between the UE 300 and the server. Examples for evaluating a data throughput are e.g. discussed below in connection with the methods 700 and 800 of FIGS. 7 and 8. In a further act 34, a circuit coupled to a second dynamic receive diversity antenna port of the client is selectively activated or deactivated based on the evaluation of the data throughput. Referring back to FIG. 3, for example, the control unit 24 may activate/deactivate the second receiver circuit 16B coupled to the second antenna port 14B. By deactivating the receiver circuit, a power consumption of the client may be reduced during its operation.

Figure 5:
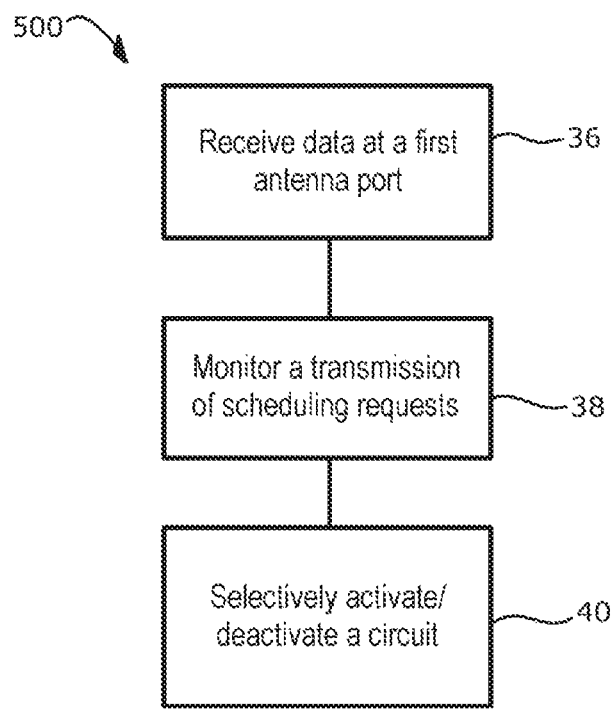
FIG. 5 schematically illustrates a method 500 based on dynamic receive diversity in accordance with the disclosure.

FIG. 5 schematically illustrates a method 500 based on dynamic receive diversity in accordance with the disclosure. The method 500 may be seen as an example illustrating a basic concept of the present disclosure. The method 500 may be extended by further acts, for example by one or more of the acts described in connection with the methods 700 and 800 of FIGS. 7 and 8.

In an act 36, data is received from a server at a first dynamic receive diversity antenna port of a client. Referring back to FIG. 3, the client may e.g. correspond to the UE 300 which may receive data from a server at e.g. the first antenna port 14A. In a further act 38, a transmission of scheduling requests from the client to the server is monitored. Referring back to FIG. 3, for example, a protocol stack software that may run on the processing unit 22 may be configured to control and monitor a transmission of scheduling requests. In a further act 40, a circuit coupled to a second dynamic receive diversity antenna port is selectively activated if no transmission of scheduling requests is detected during a time interval greater than a predetermined first time threshold value. Referring back to FIG. 3, the control unit 24 may receive a signal from the processing unit 22 if no transmission of scheduling requests is detected during a considered time interval. Based on such trigger signal, the control unit 24 may then, for example, activate the second receiver circuit 16B in addition to the first receiver circuit 16A that may already be in an active state.

Figure 6:
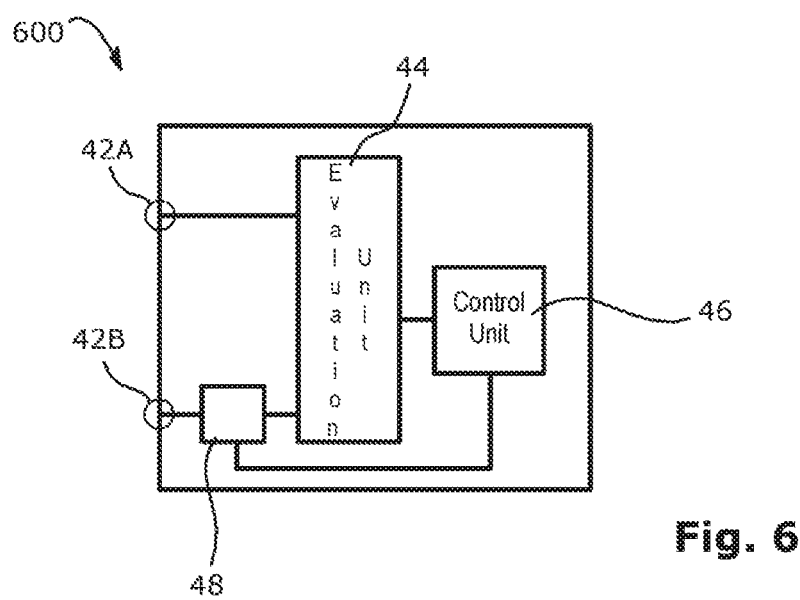
FIG. 6 schematically illustrates a device 600 configured to perform a method based on dynamic receive diversity in accordance with the disclosure.

FIG. 6 schematically illustrates a device 600 configured to perform a method based on dynamic receive diversity in accordance with the disclosure. For example, the device 600 may be configured to perform the method 400 of FIG. 4. The device 600 may include a first dynamic receive diversity antenna port 42A and a second dynamic receive diversity antenna port 42B. Each of the antenna ports 42A, 42B may be configured to receive data from a server (not illustrated). The device 600 may further include an evaluation unit 44 that may be configured to evaluate a data throughput between the server and the device 600. The device 600 may further include a control unit 46 that may be configured to selectively activate or deactivate a circuit 48 coupled to the second dynamic receive diversity antenna port 42B based on an evaluation of the data throughput.

The device 600 of FIG. 6 may be regarded as a basic concept of the present invention. Hence, the device 600 is shown in a general manner and may, of course, include further components that are not illustrated for the sake of simplicity. For example, the device 600 may further include one or more components as described in connection with FIG. 3. The device 300 of FIG. 3 may be seen as a more detailed implementation of the device 600. In this regard, the evaluation unit 44 of the device 600 may be identified with one or more of the processing unit 22 and the control unit 24 of the device 300. Further, the control unit 46 of device 600 may be identified with the control unit 24 of device 300, and the circuit 48 of the device 600 may be identified with the second receiver circuit 16B of the device 300.

Figure 7:
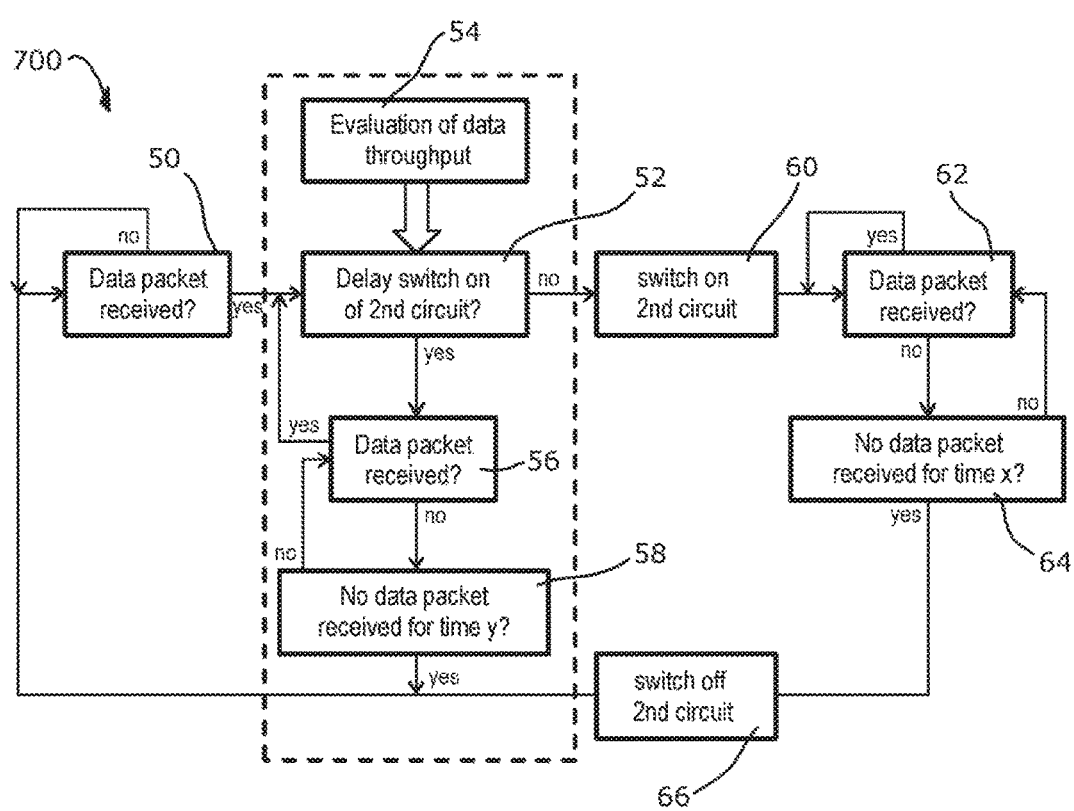
FIG. 7 schematically illustrates a method 700 based on dynamic receive diversity in accordance with the disclosure. The method 700 includes an act of selectively activating a circuit of a device based on an evaluation criterion.

FIG. 7 schematically illustrates a method 700 based on dynamic receive diversity in accordance with the disclosure. The method 700 may be seen as an enhanced version of the methods 400 and 500. The method 700 may be performed by a client of a network in a communication between the client and a server, wherein the communication may e.g. be based on a TCP. For example, each of the devices 300 and 600 may be configured to perform the method 700. In the following, the method 700 is described in connection with the device 300 of FIG. 3. In this case, one or more of the acts described in the following may be performed by at least one of the processing unit 22 and the control unit 24 of the device 300.

In an act 50, a client may monitor if a data packet is received by the client or not. For example, the client may be a diversity receiver that may be similar to the device 300 of FIG. 3. At the time of performing the act 50, the first receiver circuit 16A may be activated while the second receiver circuit 16B may be deactivated. In this regard, the second antenna port 14B may be regarded as a part of the second receiver circuit 16B or not. If no data packet is received, the act 50 may be performed again after a predetermined time interval has passed. If a reception of a data packet is detected, a further act 52 may be performed.

In the act 52, the client may decide whether the second receiver circuit 16B may be activated or whether such activation may be delayed. The decision of act 52 may depend on a result of a further act 54. In the act 54, a data throughput between the client and the server may be evaluated. In particular, such evaluation may be performed by the client. Various exemplary possibilities for evaluating the data throughput are described below. If the client decides that an activation of the second receiver circuit 16B is delayed, i.e. that the second receiver circuit 16B is not yet to be activated, a further act 56 may be performed.

In the act 56, the client may monitor if a further data packet is received by the client or not. If a reception of a data packet is detected, the act 52 may be performed again, thereby taking into account the evaluation of act 54. If no data packet is received, a further act 58 may be performed. In other words, a loop including the acts 52 and 56 may be repeated until no further data packet is received by the client. In this connection, the monitoring act 56 may be repeated periodically based on a predetermined period time.

In the act 58, the client may monitor whether a further data packet has been received by the client during a predetermined time interval of value y. For example, the considered time interval of value y may start with the first performance of act 56. In a non-limiting example, the value of the time interval y may lie in a range from about 90 milliseconds to about 110 milliseconds, and may particularly have a value of about 100 milliseconds. If the value y of the time interval has not yet passed, the act 56 may be performed again. If no data packet has been received by the client for a duration of the time interval y, the act 50 may be performed again.

It is now referred back to the act 52. If the client decides that the second receiver circuit 16B is activated, i.e. that an activation of the second receiver circuit 16B is no more delayed, a further act 60 may be performed. In the act 60, the second receiver circuit 16B may be activated. In one example, all components of the second receiver circuit 16B may be activated. In a further example, only selected components of the second receiver circuit 16B may be activated. For example, an activation of the receiver circuit may correspond to an act of powering on the respective components under consideration of the receiver circuit.

In a further act 62, after the second receiver circuit 16B has been activated, the client may monitor whether a further data packet is received by the client. For example, the act 62 may be similar to one of the acts 50 and 56. If a reception of a further data packet is detected, the components previously activated remain activated and data reception may be continued, i.e. act 62 may be performed again. If no further data packet is received, a further act 64 may be performed.

In the act 64, the client may monitor whether a further data packet has been received by the client during a predetermined time interval of value x. The act 64 may e.g. be similar to the act 58. In one example, the value of the time interval x may lie in a range from about 90 milliseconds to about 110 milliseconds, and may particularly have a value of about 100 milliseconds. The time intervals x and y of the acts 58 and 64 may be similar or may differ from each other.

If no data packet has been received by the client for the duration of the time interval x, a further act 66 may be performed. Otherwise, the act 62 may be performed again. In the act 66, the components previously activated in act 60 may be deactivated. If the act 66 has been performed and the respective components are deactivated, the act 50 may be performed again.

In FIG. 7, the acts 52 to 58 are arranged in a dashed rectangle. In a further method, the acts in the rectangle may be omitted. In this case, if a data packet is received in the act 50, the second receiver circuit 16B may be activated immediately without a further evaluation of a data throughput between the server and the client as performed in the act 54. Since an activation of the second receiver circuit 16B may result in an increased power consumption of the client, including the acts of the rectangle may reduce a power consumption of the client.

The method 700 has been exemplarily described in connection with the device 300 of FIG. 3 including two receive antenna ports coupled to respective receiver circuits. It is understood that the method 700 may also be extended to devices including more than two receive antenna ports and receiver circuits coupled thereto. For example, further acts of such extended method may delay an activation of such further receiver circuits.

Referring back to the act 54, examples for evaluating a data throughput between the server and the client are discussed in the following. The described possibilities for an evaluation may be combined in an arbitrary fashion.

In one example, evaluating the data throughput in the act 54 of FIG. 7 may include an act of monitoring a transmission of scheduling requests from the client to the server. Here, an activation of the second receiver circuit 16B may be performed if no transmission of scheduling requests from the client to the server is detected during a time interval greater than a predetermined time threshold value. For example, the time threshold value may lie in a range from about 90 milliseconds to about 110 milliseconds, and may particularly have a value of about 100 milliseconds. Referring back to the scenario of FIG. 2A, the second receiver circuit 16B may be required in the section of continuous DL activity such that it may be reasonable to activate the circuit. In the section of continuous DL activity, the client may not necessarily transmit scheduling requests to the server. The status of continuous DL activity may be detected by the described monitoring of a transmission of scheduling requests. For example, the transmission of scheduling requests may be monitored by at least one of the processing unit 22 and the control unit 24. In one example, the transmission may be monitored by a protocol stack software running on a digital signal processor. In particular, the scheduling requests may be detected as long as the client operates in the non-continuous DL activity section.

In a further example, evaluating the data throughput in the act 54 of FIG. 7 may include an act of detecting a data rate based on data received at the client from the server. Here, an activation of the second receiver circuit 16B may be carried out if the detected data rate is greater than a data rate threshold value. For example, the data rate threshold value may lie in a range from about 5 Mbit per second to about 15 Mbit per second, and particularly have a value of about 10 Mbit per second. Referring back to the scenario of FIG. 2A, the second receiver circuit 16B may be required during the section of continuous DL activity such that the circuit may be activated when this state is detected. The state of continuous DL activity may be determined by detecting the rate of received data rate, in particular when the data rate exceeds the data rate threshold value. For example, the data rate may be detected by at least one of the processing unit 22 and the control unit 24. In one example, the data rate may be determined by a protocol stack software running on a digital signal processor.

In a further example, evaluating the data throughput in the act 54 of FIG. 7 may include an act of detecting a time duration between a reception of a first data packet at the client from the server and a reception of a subsequent second data packet at the client from the server. Here, an activation of the second receiver circuit 16B may be carried out if the time duration is smaller than a time threshold value. For example, the time threshold value may lie in a range from about 10 milliseconds to about 50 milliseconds. Referring back to the scenario of FIG. 2A, the second receiver circuit 16B may be required during the section of continuous DL activity. The status of continuous DL activity may be detected by detecting the size of the gaps between two subsequent data packets received at the client. If the size of the gaps is smaller than the time threshold value, it may be assumed that the client already operates in the continuous DL activity section.

In a further example, evaluating the data throughput in the act 54 of FIG. 7 may include an act of detecting a discontinuation of a data transmission between the client and the server, wherein the discontinuation may be based on a receive window. Here, an activation of the second receiver circuit 16B may be performed if no discontinuation is detected. Referring back to FIG. 2A, the size of the receive window may increase with time. That is, the size of the receive window may be small at the start of a file download such that the data communication between the server and the client may be discontinued at times. In general, a discontinuation may occur in the section of non-continuous DL activity and/or the section of continuous activity. If such discontinuation is detected, it may be reasonable to leave the second receiver circuit 16B deactivated. With an increasing size of the receive window, a previous discontinuation may end such that the receive window may not necessarily limit the data transmission between the client and the server anymore. At the time when a discontinuation caused by the receive window is no more detected, it may be reasonable to activate the second receiver circuit 16B.

For example, detecting a discontinuation of a data transmission between the client and the server may include an act of inspecting a data packet received by the client. The client may receive a data packet and may, based on a data inspection of the data packet, detect whether the received data packet corresponds to a TCP data packet. Corresponding information may e.g. be included in a header of the data packet. For the case of a TCP data packet, the client may detect the sequence number of the data packet. Based on the known sequence number and additional information on the current receive window, it may be determined if a discontinuation of the data communication is caused by the current size of the receive window or not. A data inspection and a detection of a discontinuation may, for example, be performed by at least one of the processing unit 22 and the control unit 24 of FIG. 3.

For example, a discontinuation of a data transmission between the client and the server may be detected by a protocol stack software that may e.g. run on a digital signal processor. In particular, the protocol stack software may know at any given time the sequence numbers of the received data packets and the size of the current receive window. Based on this information, the software may determine if a discontinuation of the data communication is caused by the current size of the receive window or not. The protocol stack software may be configured to generate a trigger signal and transmit this signal to a control unit that may be configured to selectively activate and deactivate one or more circuits coupled to a dynamic receive diversity antenna port. Referring back to the device 300 of FIG. 3, a TCP software running on the processing unit 22 may monitor whether the data communication between the client and the server may be discontinued based on the receive window. If an end of a discontinuation is detected, the processing unit 22 may generate a trigger signal and transmit the trigger signal to the control unit 24. After receiving the trigger signal, the control unit 24 may activate the second receiver circuit 16B.

In a further example, evaluating the data throughput in the act 54 of FIG. 7 may include an act of determining a first data throughput, the first data throughput being based on data transmitted between the server and the first receiver circuit 16A of the client, and an act of determining a second data throughput, the second data throughput being based on data transmitted between the server and the first receiver circuit 16A as well as data transmitted between the server and the second receiver circuit 16B. In a further act, the first data throughput and the second data throughput may be compared. Based on the outcome of the comparison, the one or more of the receiver circuits may be activated or deactivated.

For example, a relative throughput may be considered for an evaluation of the throughput between the client and the server. A relative throughput may e.g. correspond to the first data throughput divided by the second data throughput or vice versa. Such relative throughput may represent a measure and/or indicator for delaying an activation of the second receiver circuit. The relative throughput may estimate if more throughput would be possible with MIMO reception, i.e. with the second receiver circuit being activated. In this connection, the throughput may be based on at least one of the throughput per TTI (Transmission Time Interval)/subframe, the throughput per PRB (Physical Resource Block), and the throughput per TTI/subframe per PRB.

An evaluation of a throughput between the client and the server, in particular a relative throughput as described above, may further be based on a cell load. If the cell under consideration is loaded, e.g. including the own data connection, an activation of the second receiver circuit may provide an increased throughput, because the client may be unlikely to get more resources. If the cell is not loaded, the UE may also achieve an increased throughput without the second receiver circuit being activated by getting more resources from the network. Hence, the second antenna receiver circuit may be deactivated, because the antenna may not necessarily represent a limiting factor to the data communication. For example, the cell load estimation may be based on one or more of the following values: RSSI (Received Signal Strength Indication), RSRP (Reference Signal Received Power), RSRQ (Reference Signal Received Quality), and SNR (Signal-to-Noise Ratio). In wireless standards, a base station may broadcast a cell load bit or an indicator to enable UEs to adjust their communication behavior to improve an overall network performance. Such cell load indicator may also be used for determining a relative throughput or an evaluation of a throughput between the client and the server.

For detecting a relative throughput, the client may e.g. implement a short test sequence, which may run on a regular basis. In this test sequence the client may switch from an operational mode of using only one receiver circuit to an operational mode of using two or even more receiver circuits. The client may then determine whether the throughput improves or not by activating the additional receiver circuit(s) and may react accordingly.

Figure 8:
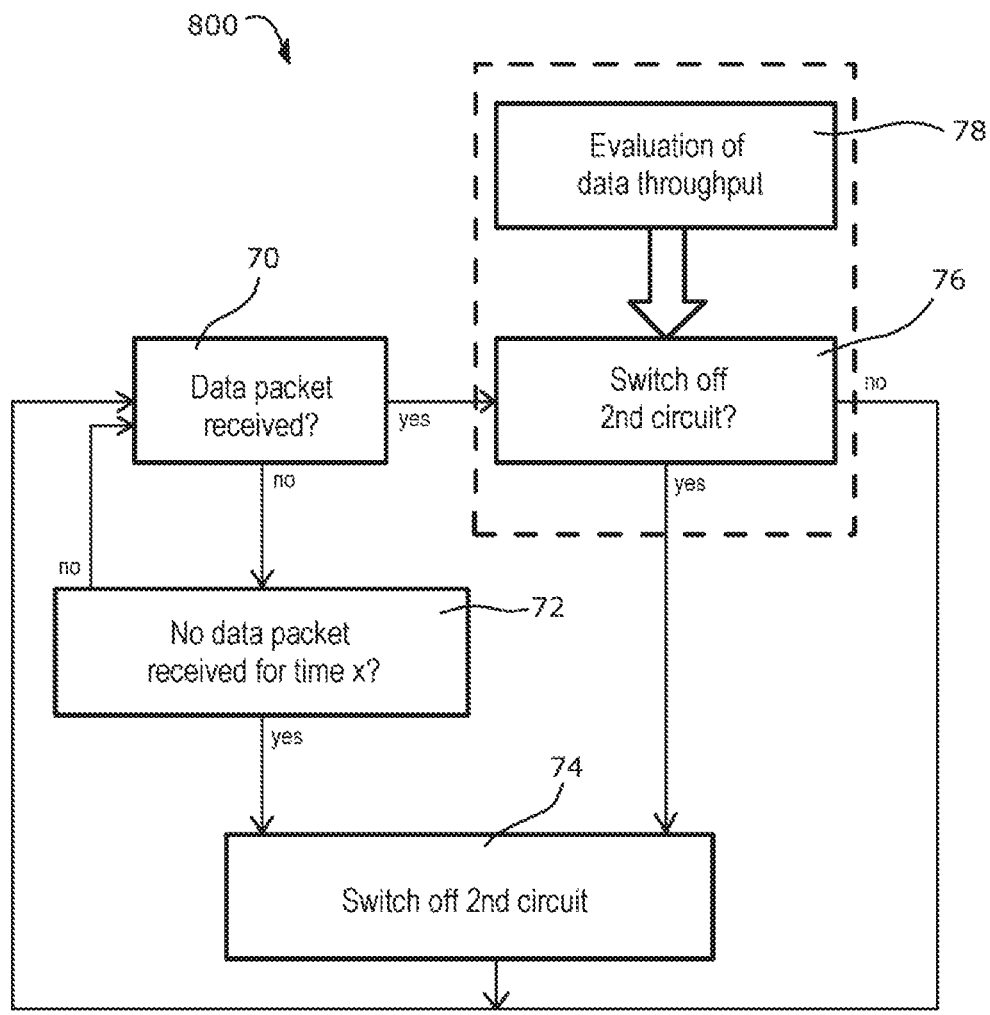
FIG. 8 schematically illustrates a method 800 based on dynamic receive diversity in accordance with the disclosure. The method 800 includes an act of selectively deactivating a circuit of a device based on an evaluation criterion.

FIG. 8 schematically illustrates a method 800 based on dynamic receive diversity in accordance with the disclosure. The method 800 may be seen as an enhanced version of the methods 400 and 500. The method 800 may be performed by a client during a communication between the client and a server. In one example, the communication may be based on a TCP. For example, each of the devices 300 and 600 may be configured to perform the method 800. In the following, the method 800 is described in connection with the device 300 of FIG. 3. In this case, one or more of the acts described in the following may e.g. be performed by at least one of the processing unit 22 and the control unit 24 of the device 300.

In an act 70, a client may monitor if a data packet is received by the client or not. For example, the client may be a diversity receiver that may be similar to the device 300 of FIG. 3. At the time of performing the act 70, the first receiver circuit 16A and the second receiver circuit 16B may be activated. If no data packet is received, a further act 72 may be performed.

In the act 72, the client may monitor whether a further data packet is received by the client during a predetermined time interval of value x. The act 72 may e.g. be similar to the act 64 of FIG. 7. In one example, the value of the time interval x may lie in a range from about 90 milliseconds to about 110 milliseconds, and may particularly have a value of about 100 milliseconds. If no data packet is received by the client for the duration of the time interval x, a further act 74 may be performed. Otherwise, the act 70 may be performed again.

In the act 74, at least one component of the second receiver circuit 16B may be deactivated. In this regard, the second antenna port 14B may be regarded as a part of the second receiver circuit 16B or not. If the act 74 has been performed and the respective components are deactivated, the act 70 may be performed again.

Referring back to act 70, if a further data packet is received by the client, a further act 76 may be performed. In the act 76, it may be decided whether the second receiver circuit 16B is deactivated or not. The decision of act 76 may depend on a result of a further act 78. In the act 78, a data throughput between the client and the server may be evaluated. In particular, such evaluation may be performed by the client. Various possibilities for evaluating the data throughput are described below. If it is decided that the second receiver circuit 16B is deactivated, the act 74 may be performed. Otherwise, the act 70 may be performed.

In FIG. 8, the acts 76 and 78 are arranged in a dashed rectangle. In a further method, the acts of the rectangle may be omitted. In this case, if a data packet is received in the act 70, the second receiver circuit 16B may remain active without a further evaluation whether the second receiver circuit 16B may be deactivated based on the act 78. Since an activation of the second receiver circuit 16B may result in an increased power consumption of the client, an additional application of the acts 76 and 78 of the rectangle may reduce a power consumption of the client.

Referring back to the act 78, examples for evaluating a data throughput between the server and the client are discussed in the following. The described possibilities may be combined in an arbitrary fashion. In addition, various examples for evaluating a data throughput between a client and a server have been discussed in connection with the act 54 of FIG. 7. These examples may be adapted to act 78.

In one example, evaluating the data throughput in the act 78 of FIG. 8 may include an act of monitoring a transmission of scheduling requests from the client to the server. Here, a deactivation of the second receiver circuit 16B (see act 76 of method 800) may be performed if a transmission of scheduling requests is detected. Referring back to the scenario of FIG. 2A, the second receiver circuit 16B may not necessarily be required during the section of non-continuous DL activity in which scheduling requests may be transmitted from the client to the server. The status of non-continuous DL activity may be detected by monitoring of a transmission of scheduling requests as described above.

In a further example, evaluating the data throughput in the act 78 of FIG. 8 may include an act of detecting a data rate based on data received at the client. Here, a deactivation of the second receiver circuit 16B may be carried out if the detected data rate is smaller than a data rate threshold value. In this regard, all comments made in connection with the act 54 of method 700 may also hold true for act 78. Referring back to FIG. 2A, the data rate may particularly be used to detect whether the data transmission between the client and the server lies in the section of non-continuous DL activity.

In a further example, evaluating the data throughput in the act 78 of FIG. 8 may include an act of detecting a time duration between a reception of a first data packet at the client from the server and a reception of a subsequent second data packet at the client from the server. Here, a deactivation of the second receiver circuit 16B may be executed if the time duration is greater than a time threshold value. In this regard, all comments made in connection with the act 54 of method 700 may also hold true for act 78. Referring back to FIG. 2A, the data rate may particularly be used to detect whether the data transmission between the client and the server lies in the section of non-continuous DL activity.

In a further example, evaluating the data throughput in the act 78 of FIG. 8 may include an act of detecting a discontinuation of a data transmission between the client and the server, wherein the discontinuation may be based on a receive window. Here, a deactivation of the second receiver circuit 16B may be performed if such discontinuation is detected. During a communication between the client and the server, the throughput in the network may not be limited by the current size of the receive window. However, there may also occur a situation in which the size of the receive window changes to a value such that the data communication between the server and the client may be discontinued. If such discontinuation is detected, it may be reasonable to deactivate the second receiver circuit 16B.

Figures 9A, 9B:
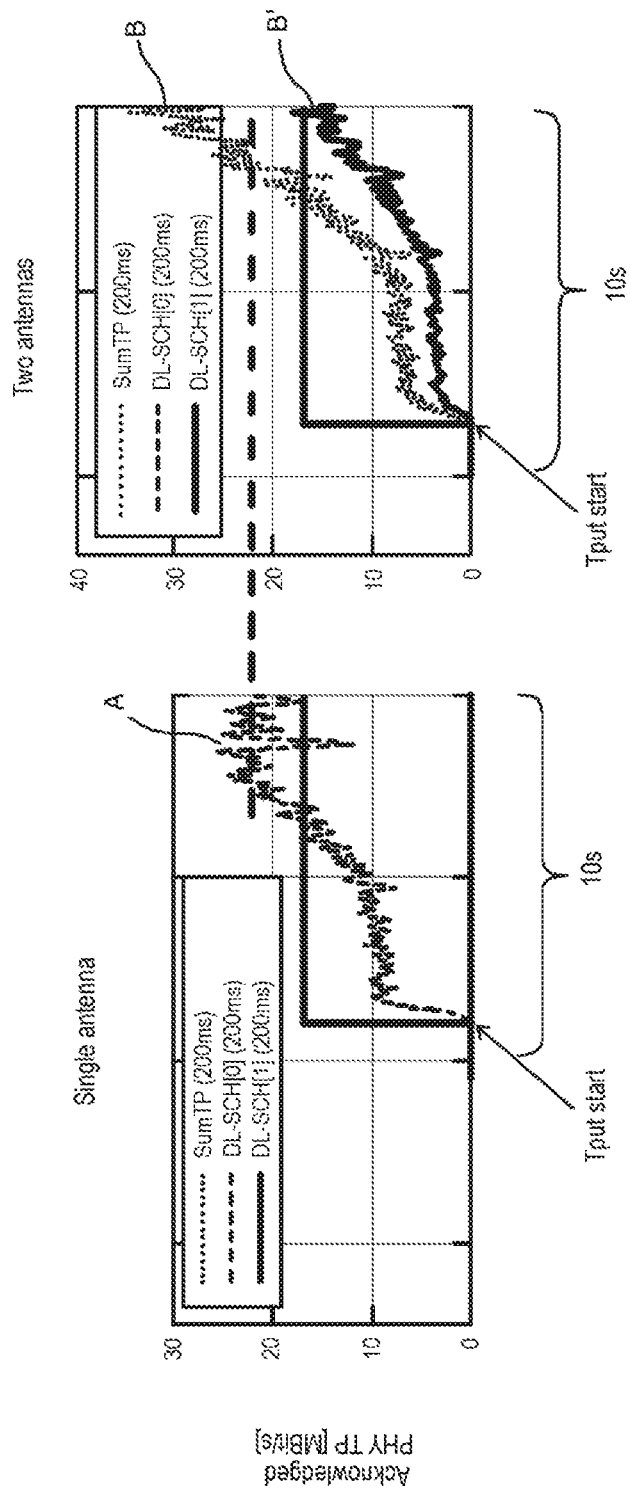
FIG. 9A shows a time/sequence diagram based on a data communication between a server and a client. During the data communication only one receiver circuit coupled to a respective antenna port is active in the client.
FIG. 9B shows a time/sequence diagram based on a data communication between a server and a client. During the data communication two receiver circuits, each coupled to a respective antenna port, are active in the client.

FIG. 9A illustrates a time/sequence diagram based on a data communication between a server and a client. Similar to FIG. 2A, the horizontal axis represents the time in seconds, and the vertical axis represents the throughput of acknowledged data transmitted from the server to the client. For example, the client may correspond to the device 300 of FIG. 3. In this case, during the data communication, only the first receiver circuit 16A is active while the second receiver circuit 16B is not activated.

FIG. 9B illustrates a time/sequence diagram based on a data communication between a server and a client. During the data communication two receiver circuits of the client are activated. That is, in contrast to FIG. 9A, during the data communication, the first receiver circuit 16A is active and, in addition, the second receiver circuit 16B is active.

More specifically, the scenario of FIGS. 9A and 9B may relate to an LTE FTP/TCP download of a file, wherein the figures illustrate an initial phase of the file download. In both cases, the client may e.g. correspond to a smart phone, wherein the only difference may be that in the case of FIG. 9A, a second receiver circuit remains unused.

FIGS. 9A and 9B illustrate a throughput in the first 8 to 9 seconds of the file download. In FIG. 9A, the sum throughput is indicated by a graph A corresponding to the throughput associated with the single active receiver circuit. In FIG. 9B, the sum throughput considering both MIMO layers is indicated by a graph B while the throughput considering only one MIMO layer is indicated by a graph B'. In FIGS. 9A and 9B, the file downloads start at different times. Therefore, an explicit labeling of the horizontal axis is omitted, but an interval having a length of about 10 seconds is indicated in each figure.

It can be seen that the throughput of both devices first ramps up to a level slightly below 10 Mbps. Here, the increase in the throughput may be even slightly slower for the two antenna device. After about 4 to 5 seconds, the throughout starts to ramp up faster. After, in total, about 7 to 8 seconds, the throughput of the device using only one single receiver circuit is settling at slightly above 20 Mbps.

After, in total, about 7 to 8 seconds, the two antenna device may outperform the single antenna device in terms of throughput. However, during an initial phase, there may be no gain by the second antenna, i.e. the second receiver circuit. Hence, in the first 7 to 8 seconds, it may be reasonable to deactivate the second receiver circuit such that power may be saved. In addition, the total amount of data transmitted in this first 8 seconds may be in the order of 8 sec×10 Mbps, i.e. approximately 80 Mbit=10 MB. This data volume may be more than the size of a webpage, for example about 1 MB. Since HTTP, which may be used for a file download, may be based on TCP, there may be no visible difference for the client between a file download and a website download. With a download of a 1 MB website taking thus only about 1 second, it may be reasonable to leave the second receiver circuit inactive if the detected data volume during one specific established connection between the client and the server is smaller than a predetermined data volume threshold value, because there may be no throughput gain by using it. Instead, an activation of the second receiver circuit may consume unnecessary power. For example, the data volume threshold value may be about 1 MB. In one example, a "specific established connection" between the client and the server can be defined as the data connection between the client and the server during the time between two three-way handshakes directly following each other. In a further example, a "specific established connection" between the client and the server may be defined as the data connection during the time between a three-way handshake establishing a connection and a subsequent termination of the established connection.

Examples

The following pertains to further embodiments.

Example 1 is a method comprising: receiving data from a server at a first dynamic receive diversity antenna port of a client; evaluating a data throughput between the server and the client; and selectively activating or deactivating a circuit coupled to a second dynamic receive diversity antenna port of the client based on the evaluation of the data throughput.

In Example 2, the subject matter of Example 1 can optionally include that evaluating the data throughput comprises monitoring a transmission of scheduling requests from the client to the server.

In Example 3, the subject matter of Example 2 can optionally include selectively activating the circuit coupled to the second dynamic receive diversity antenna port if no transmission of scheduling requests is detected during a time interval greater than a predetermined first time threshold value.

In Example 4, the subject matter of Example 3 can optionally include that the first time threshold value is 100 milliseconds.

In Example 5, the subject matter of one of the preceding Examples can optionally include selectively deactivating the circuit coupled to the second dynamic receive diversity antenna port if a transmission of scheduling requests is detected.

In Example 6, the subject matter of one of the preceding Examples can optionally include that evaluating the data throughput comprises detecting a data rate based on data received at the client.

In Example 7, the subject matter of Example 6 can optionally include at least one of selectively activating the circuit coupled to the second dynamic receive diversity antenna port if the detected data rate is greater than a data rate threshold value, and selectively deactivating the circuit coupled to the second dynamic receive diversity antenna port if the detected data rate is smaller than a data rate threshold value.

In Example 8, the subject matter of Example 7 can optionally include that the data rate threshold value is 10 Mbit per second.

In Example 9, the subject matter of one of the preceding Examples can optionally include that evaluating the data throughput comprises detecting a data volume based on data received at the client.

In Example 10, the subject matter of Example 9 can optionally include selectively activating the circuit coupled to the second dynamic receive diversity antenna port if the detected data volume during one specific established connection between the client and the server is greater than a data volume threshold value.

In Example 11, the subject matter of Example 10 can optionally include that the data volume threshold value is 1 Megabyte.

In Example 12, the subject matter of one of the preceding Examples can optionally include that evaluating the data throughput comprises detecting a time duration between a reception of a first data packet at the client and a reception of a subsequent second data packet at the client.

In Example 13, the subject matter of Example 12 can optionally include at least one of selectively activating the circuit coupled to the second dynamic receive diversity antenna port if the time duration is smaller than a second time threshold value, and selectively deactivating the circuit coupled to the second dynamic receive diversity antenna port if the time duration is greater than a second time threshold value.

In Example 14, the subject matter of Example 13 can optionally include that the second time threshold value lies in a range from 10 milliseconds to 50 milliseconds.

In Example 15, the subject matter of one of the preceding Examples can optionally include that evaluating the data throughput comprises detecting a discontinuation of a data transmission between the client and the server, wherein the discontinuation is based on a receive window.

In Example 16, the subject matter of Example 15 can optionally include at least one of selectively activating the circuit coupled to the second dynamic receive diversity antenna port if no discontinuation is detected, and selectively deactivating the circuit coupled to the second dynamic receive diversity antenna port if a discontinuation is detected.

In Example 17, the subject matter of Example 15 or 16 can optionally include that detecting a discontinuation of a data transmission between the client and the server comprises inspecting a data packet received by the client.

In Example 18, the subject matter of Example 15 or 16 can optionally include that the discontinuation is detected by a protocol stack software.

In Example 19, the subject matter of one of the preceding Examples can optionally include generating a trigger signal by a protocol stack software, and transmitting the trigger signal to a control unit configured to selectively activate and deactivate the circuit coupled to the second dynamic receive diversity antenna port.

In Example 20, the subject matter of one of the preceding Examples can optionally include that evaluating the data throughput comprises determining a first data throughput based on data transmitted between the server and the first dynamic receive diversity antenna port, and determining a second data throughput based on data transmitted between the server and the first dynamic receive diversity antenna port and data transmitted between the server and the second dynamic receive diversity antenna port.

In Example 21, the subject matter of Example 20 can optionally include that selectively activating or deactivating the circuit comprises comparing the first data throughput to the data second throughput.

Example 22 is a method comprising: receiving data from a server at a first dynamic receive diversity antenna port of a client; monitoring a transmission of scheduling requests from the client to the server; and selectively activating a circuit coupled to a second dynamic receive diversity antenna port if no transmission of scheduling requests is detected during a time interval greater than a predetermined time threshold value.

In Example 23, the subject matter of Example 22 can optionally include that the time threshold value is 100 milliseconds.

In Example 24, the subject matter of Example 22 or 23 can optionally include selectively deactivating the circuit coupled to the second dynamic receive diversity antenna port if a transmission of scheduling requests is detected.

Example 25 is a device comprising: a first dynamic receive diversity antenna port and a second dynamic receive diversity antenna port, each configured to receive data from a server; an evaluation unit configured to evaluate a data throughput between the server and the device; and a control unit configured to selectively activate or deactivate a circuit coupled to the second dynamic receive diversity antenna port based on an evaluation of the data throughput.

In Example 26, the subject matter of Example 25 can optionally include a monitoring unit configured to monitor a transmission of scheduling requests from the device to the server.

In Example 27, the subject matter of Example 25 or 26 can optionally include an application processor configured to run a protocol stack software, wherein the protocol stack software is configured to detect a discontinuation of a data transmission between the device and the server.

In Example 28, the subject matter of Example 25 or 26 can optionally include an application processor configured to run a protocol stack software, wherein the protocol stack software is configured to generate a trigger signal and transmit the trigger signal to the control unit.

Example 29 is a device comprising: first receiving means for receiving data from a server; second receiving means for receiving data from the server; evaluation means for evaluating a data throughput between the server and the device; and control means for selectively activating or deactivating a circuit coupled to the second receiving means based on an evaluation of the data throughput.

In Example 30, the subject matter of Example 29 can optionally include monitoring means for monitoring a transmission of scheduling requests from the device to the server.

In Example 31, the subject matter of Example 29 or 30 can optionally include processing means for running a protocol stack software, wherein the protocol stack software is configured to detect a discontinuation of a data transmission between the device and the server.

In Example 32, the subject matter of Example 29 or 30 can optionally include processing means for running a protocol stack software, wherein the protocol stack software is configured to generate a trigger signal and transmit the trigger signal to the control unit.

Example 33 is a network comprising: a server; and a client, wherein the client comprises a device of one of Examples 22 to 29.

Example 34 is a computer readable medium on which computer instructions are stored which when executed by a computer, cause the computer to perform the method of one Examples 1 to 21.

In addition, while a particular feature or aspect of the disclosure may have been disclosed with respect to only one of several implementations, such feature or aspect may be combined with one or more other features or aspects of the other implementations as may be desired and advantageous for any given or particular application. Furthermore, to the extent that the terms "include", "have", "with", or other variants thereof are used in either the detailed description or the claims, such terms are intended to be inclusive in a manner similar to the term "comprise". Furthermore, it is understood that aspects of the disclosure may be implemented in discrete circuits, partially integrated circuits or fully integrated circuits or programming means. Also, the terms "exemplary", "for example" and "e.g." are merely meant as an example, rather than the best or optimal.

Furthermore, in particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention. For example, the any component or structure may include a processor executing instructions in order to perform at least portions of the various functions.

Although specific aspects have been illustrated and described herein, it will be appreciated by those of ordinary skill in the art that a variety of alternate and/or equivalent implementations may be substituted for the specific aspects shown and described without departing from the scope of the present disclosure. This application is intended to cover any adaptations or variations of the specific aspects discussed herein.

The invention claimed is:
1. A method at a client, comprising:
receiving data from a server at a first dynamic receive diversity antenna port, the data including a data packet;

evaluating a data throughput of the data from the server;
subsequent to receipt of the data, determining to delay activating a receiver circuit coupled to a second dynamic receive diversity antenna port based on the data throughput;
    subsequent to the act of determining to delay the activating the receiver circuit, selectively activating the receiver circuit based on the data throughput at a time that is based upon a cumulative time including a first time period during which packets are received by the client, (i) an expiration of the first time period that indicates a start of a pause in receiving data packets, and (ii) an expiration of a second time period that indicates an end of the pause in receiving data packets and that one or more data packets are again received by the client, the evaluating of the data throughput being repeated at least until the expiration of the first time period.

2. The method of claim 1, wherein evaluating the data throughput comprises monitoring a transmission of scheduling requests to the server.

3. The method of claim 2, further comprising: selectively activating the receiver circuit coupled to the second dynamic receive diversity antenna port if no transmission of scheduling requests is detected during a time interval greater than a predetermined first time threshold value.

4. The method of claim 3, wherein the first time threshold value is about 100 milliseconds.

5. The method of claim 1, further comprising: selectively deactivating the receiver circuit coupled to the second dynamic receive diversity antenna port if a transmission of scheduling requests is detected.

6. The method of claim 1, wherein evaluating the data throughput comprises detecting a data rate based on data received.

7. The method of claim 6, further comprising at least one of: selectively activating the receiver circuit coupled to the second dynamic receive diversity antenna port if the detected data rate is greater than a data rate threshold value; and selectively deactivating the receiver circuit coupled to the second dynamic receive diversity antenna port if the detected data rate is smaller than a data rate threshold value.

8. The method of claim 7, wherein the data rate threshold value is about 10 Mbit per second.

9. The method of claim 1, wherein evaluating the data throughput comprises detecting a time duration between reception of the data packet and the reception of the subsequently received data packets.

10. The method of claim 9, further comprising at least one of: selectively activating the receiver circuit coupled to the second dynamic receive diversity antenna port if the time duration is smaller than a second time threshold value; and selectively deactivating the receiver circuit coupled to the second dynamic receive diversity antenna port if the time duration is greater than a second time threshold value.

11. The method of claim 10, wherein the second time threshold value lies in a range from about 10 milliseconds to about 50 milliseconds.

12. The method of claim 1, wherein evaluating the data throughput comprises detecting a discontinuation of a data transmission with the server based on a receive window.

13. The method of claim 12, further comprising at least one of:
    selectively activating the receiver circuit coupled to the second dynamic receive diversity antenna port if no discontinuation is detected; and
    selectively deactivating the receiver circuit coupled to the second dynamic receive diversity antenna port if a discontinuation is detected.

14. The method of claim 12, wherein detecting a discontinuation of a data transmission between the client and the server comprises inspecting a data packet received.

15. The method of claim 12, wherein the discontinuation is detected by a protocol stack software.

16. The method of claim 1, further comprising:
    generating a trigger signal by a protocol stack software; and
    transmitting the trigger signal to one or more processors configured to selectively activate and deactivate the receiver circuit coupled to the second dynamic receive diversity antenna port.

17. The method of claim 1, wherein evaluating the data throughput comprises:
    determining a first data throughput based on data received from the server via the first dynamic receive diversity antenna port while the receiver circuit coupled to the second dynamic receive diversity antenna port is deactivated; and
    determining a second data throughput based on data received from the server via the first and second dynamic receive diversity antenna ports while the receiver circuit coupled to the second dynamic receive diversity antenna port is activated.

18. The method of claim 17, wherein selectively activating the receiver circuit comprises selectively activating the receiver circuit based upon the comparison of the first data throughput to the second data throughput.

19. The method of claim 1, wherein the activation of the receiver circuit is delayed until there is continuous data reception from the server at the first dynamic receive diversity antenna port.

20. A method, comprising:
    receiving data from a server at a first dynamic receive diversity antenna port;
    monitoring a transmission of scheduling requests to the server; and
    subsequent to the transmission of the scheduling requests to the server, determining whether to delay activating a receiver circuit coupled to a second dynamic receive diversity antenna port; and
    subsequent to the act of determining whether to delay the activating the receiver circuit, selectively activating the receiver circuit based on no transmission of scheduling requests being detected during a time interval greater than a predetermined time threshold value either (i) at a first time, when it is determined that a delay is not needed, or (ii) at a second time that is different than the first time, when it is determined that a delay is needed.

21. The method of claim 20, wherein the time threshold value is about 100 milliseconds.

22. The method of claim 20, further comprising:
    selectively deactivating the receiver circuit coupled to the second dynamic receive diversity antenna port when no data packets have been received from the server for a predetermined time period.

23. The method of claim 20, wherein the activation of the receiver circuit is delayed until there is continuous data reception from the server at the first dynamic receive diversity antenna port.

24. A device, comprising:
    a first dynamic receive diversity antenna port and a second dynamic receive diversity antenna port, each configured to receive data from a server, the data including a data packet; and one or more processors configured to:

evaluate a data throughput of the data from the server;

subsequent to receipt of the data, determine to delay activating a receiver circuit coupled to the second dynamic receive diversity antenna port based on the data throughput; and subsequent to determining to delay the activating the receiver circuit, selectively activate the receiver circuit based on the data throughput such that the selective activation of the receiver circuit occurs at a time that is based upon a cumulative time that includes a first time period during which packets are received by the device, (i) an expiration of the first time period that indicates a start of a pause in receiving data packets, and (ii) an expiration of a second time period that indicates an end of the pause in receiving data packets and that one or more data packets are again received by the device, the evaluating of the data throughput being repeated at least until the expiration of the first time period.

25. The device of claim 24, wherein the one or more processors are further configured to monitor a transmission of scheduling requests to the server.

26. The device of claim 24, further comprising:

an application processor configured to run a protocol stack software, wherein the protocol stack software is configured to detect a discontinuation of a data transmission with the server.

27. The device of claim 24, further comprising:

an application processor configured to run a protocol stack software, wherein the protocol stack software is configured to generate a trigger signal and transmit the trigger signal to the one or more processors.

28. The device of claim 24, wherein the one or more processors are configured to delay the activation of the receiver circuit until there is continuous data reception from the server at the first dynamic receive diversity antenna port.

* * * * *